United States Patent [19]

Monroe

[11] Patent Number: 5,741,450
[45] Date of Patent: Apr. 21, 1998

[54] METHOD OF AND APPARATUS FOR MOLDING A HOLLOW FAN BLADE

[75] Inventor: Robert C. Monroe, Houston, Tex.

[73] Assignee: Hudson Products Corporation, Houston, Tex.

[21] Appl. No.: 586,078

[22] Filed: Jan. 16, 1996

[51] Int. Cl.[6] .................................................. B29C 45/14
[52] U.S. Cl. .......................... 264/102; 264/257; 264/258; 425/116; 425/127; 425/129.1; 425/812
[58] Field of Search ..................................... 425/116, 127, 425/129.1, 812; 264/257, 258, 102

[56] References Cited

U.S. PATENT DOCUMENTS

| | | | |
|---|---|---|---|
| 4,513,942 | 4/1985 | Creasman | 425/129.1 |
| 5,516,271 | 5/1996 | Swenor et al. | 425/127 |
| 5,595,692 | 1/1997 | Folsom et al. | 425/13 |

Primary Examiner—Tim Heitbrink
Attorney, Agent, or Firm—Robert J. Edwards; Michael L. Hoelter

[57] ABSTRACT

A method of and apparatus for molding hollow items using the resin transfer molding technique in such a manner that the resin is more uniformly distributed about and along the molding region of the mold. This is accomplished by installing oppositely spaced grooves in the mold and injecting resin directly into these grooves. Upon such injection, the resin travels along and fills the groove (by taking the path of least resistance) before such resin is squeezed or forced out a minute gap that exists between the molding surfaces and into the molding region of the mold. As such resin is being forcibly injected into the cloths in the mold, a vent permits any air displaced from the cloths by the resin to be released. Such resin injection and mold venting occurs until such time that no more air is vented and instead 100% resin is being discharged from the mold. Upon this occurrence, further resin injection is curtailed and the resin previously injected is allowed to harden and cure. A disposable pressure bag distributes the molding pressure created by the injected resin equally within the mold. Thus, this pressure bag enables a high quality void-free plastic laminate to be made. A means of pressurizing this bag while maintaining a seal that prevents any loss of resin is also disclosed.

16 Claims, 3 Drawing Sheets

METHOD OF AND APPARATUS FOR MOLDING A HOLLOW FAN BLADE

FIELD OF THE INVENTION

This invention pertains to fan blades in general and more particularly to a method and apparatus for molding hollow fan blades using the resin transfer molding technique.

BACKGROUND OF THE INVENTION

One common method of manufacturing hollow fan blades is the resin transfer method. This method forcibly injects resin into a mold that generally contains numerous cloth strips surrounding an inflated bag. It is the intent for the injected resin to saturate these cloth strips before it hardens or cures. Afterwards, the bag is removed through an opening (such as through the neck of one-piece fan blades) and the blade removed from the mold for subsequent cleaning and inspection.

A problem associated with the resin injection method concerns air that may become trapped within the mold. If this air is not completely vented upon the injection of the resin (i.e. the resin replaces the air within the cloth within the mold), the blade will be cured with air bubbles therein which can significantly reduce the strength of the blade. The result of air bubbles trapped within the cloth layers is the formation of "dry" areas of cloth which are not "wet out" with the proper amount of resin.

It is an object of this invention to provide a method and apparatus that more evenly and uniformly distributes resin throughout the mold. Another object of this invention is to provide for a manner of inflating an internal pressure bag while still enabling resin to be transferred over the pressure port. Yet another object of this invention is to provide a method and apparatus that is capable of molding a variety of differently shaped hollow fan blades (or other objects for that matter) of superior quality. Another object of this invention is to provide a means of displacing air entrapped within the cloth layers and allowing resin to fill the void and saturate the cloth layers properly. Yet another object of this invention is to improve the productivity of molding fan blades since the rejection rate will be reduced. Still another object of this invention is to provide a means of molding more aerodynamic shaped blades. These and other objects and advantages of this invention will become obvious upon further investigation.

SUMMARY OF THE INVENTION

What is disclosed is a molding system that typically consists of a first mold and a separable but matching second mold. These first and second molds, when secured together, define a recessed molding region therebetween. A resin groove is made in one or both of these molds with this groove extending alongside but spaced from the molding region. Between these first and second molds exists a minute gap which occurs when these molds are secured together. This gap extends between the outer resin groove and the inner molding region. Resin is forcibly injected into the resin groove, not the molding region, via a resin injection assembly. This resin then takes the path of least resistance by first travelling along the resin groove before being subsequently forced out of this groove, through the gap, and into the molding region of the first and second molds. A vent is secured or coupled to the molding region for venting purposes as the resin is injected into the cloths in the molding region. This vent is spaced from the resin groove and is located and designed so that the cloths in the mold will first become filled with resin before any such resin is vented. In order to prevent the resin from leaking out of the molding region, a manner of sealing between the first and second molds is included which seals or encloses both the molding region and the resin groove.

DETAILED DESCRIPTION OF THE PREFERRED EMBODIMENTS

Figure 1:
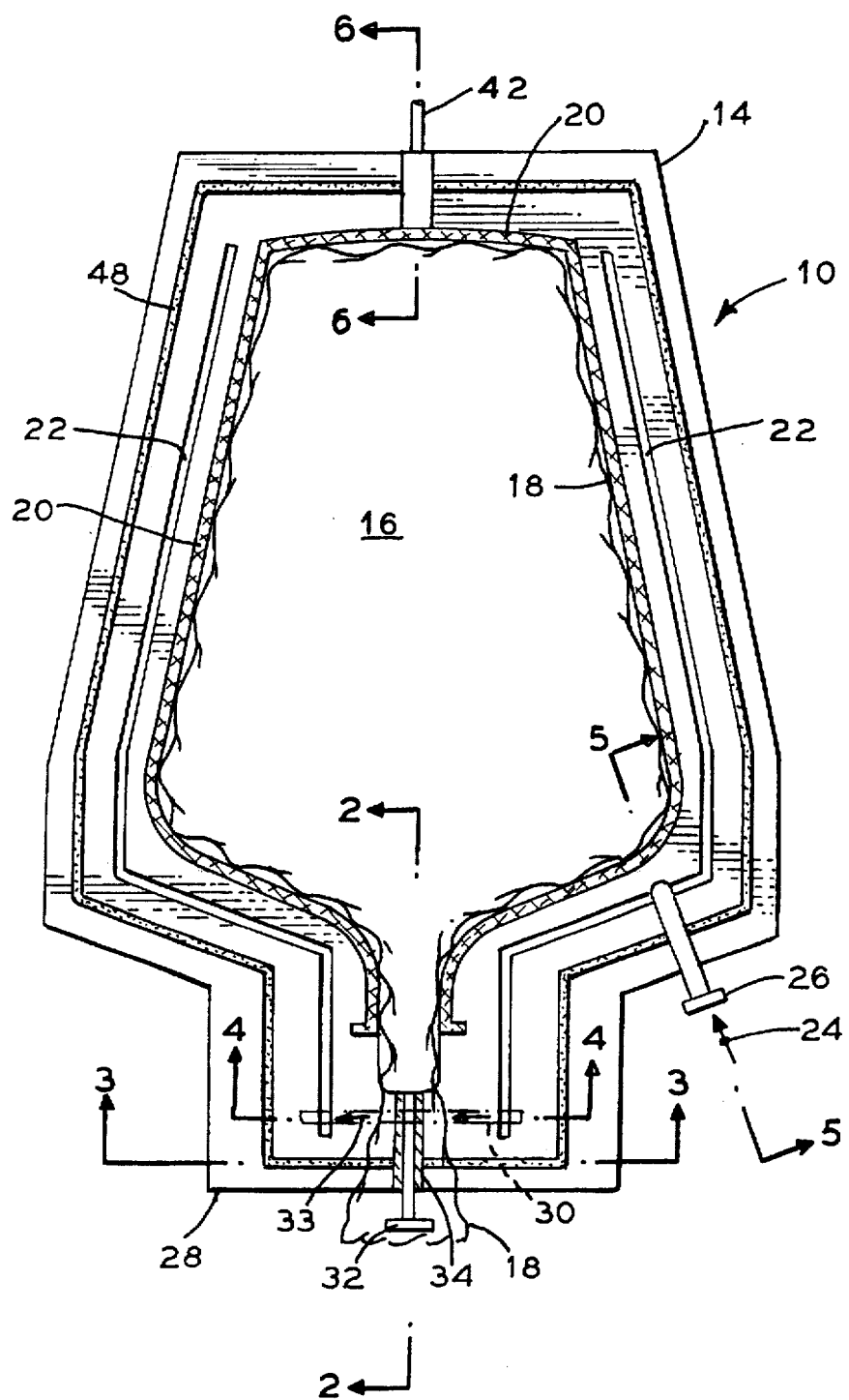
FIG. 1 is a top pictorial view of the invention with the upper mold removed for clarity.

Referring initially to FIG. 1, there is shown a top plan view of molding system 10 as contemplated by this invention. This molding system 10 comprises upper mold 12 shown in FIG. 2 but (removed from FIG. 1 for clarity) and matching lower mold 14, both of which are configured with matching concave molding regions 16 therein. An inflatable pressure bag 18 would typically be placed within this recessed molding region 16 with this bag 18 usually being covered by numerous cloth strips 20 in the normal manner. Generally, these cloth strips would be constructed of glass fibers, but other constructions of cloth strips 20 may also be suitable.

Extending along opposite sides of recessed molding region 16 are resin grooves 22 which, in this embodiment, are shown as being created in lower mold 14. However, resin grooves 22 can also be located in upper mold 12 or in both such molds 12 and 14 if so desired. These resin grooves 22 would typically surround most, if not all, of molding region 16. Resin grooves 22 may be of any size or shape so long as injected resin 24 can freely travel therealong. Such resin 24 is injected into one resin groove 22, as shown, via injection port 26, but if desired, a duplicate injection port 26 can be installed with respect to the opposite resin groove 22. Thus, resin 24 is not injected directly into molding region 16 as would typically be the case, instead, resin 24 is injected into grooves 22 through which it travels before being forced into cloths 20 in molding region 16 through minute gap 50 that exists between upper and lower molds 12 and 14.

Figure 2:
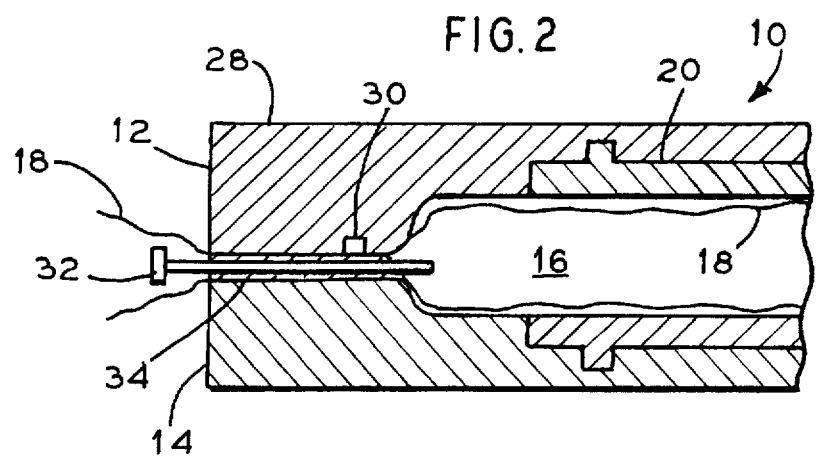
FIG. 2 is pictorial sectional view of the neck region of the invention taken along lines 2—2 of FIG. 1.
Figure 4:
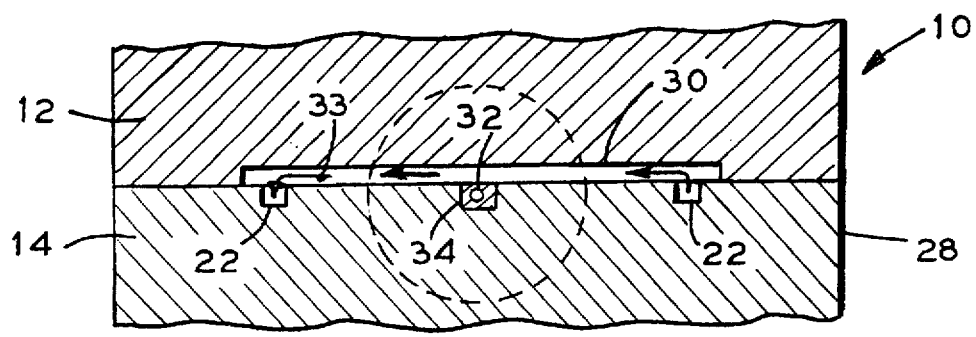
FIG. 4 is a pictorial sectional view of the neck region of the invention taken along lines 4—4 of FIG. 1.

Located at neck region 28 of molding system 10, is a resin crossover groove 30 which is used to inter-connect the oppositely spaced resin grooves 22. As indicated in FIGS. 2 and 4, this crossover groove 30 is created in upper mold 12, but it could also be in lower mold 14 if so desired upon a simple design change in molding system 10. Basically, crossover groove 30 provides a means for the oppositely spaced resin grooves 22 to be interconnected and cross over air inlet 32. This is shown by arrows 33 in FIGS. 1 and 4.

Figure 3:
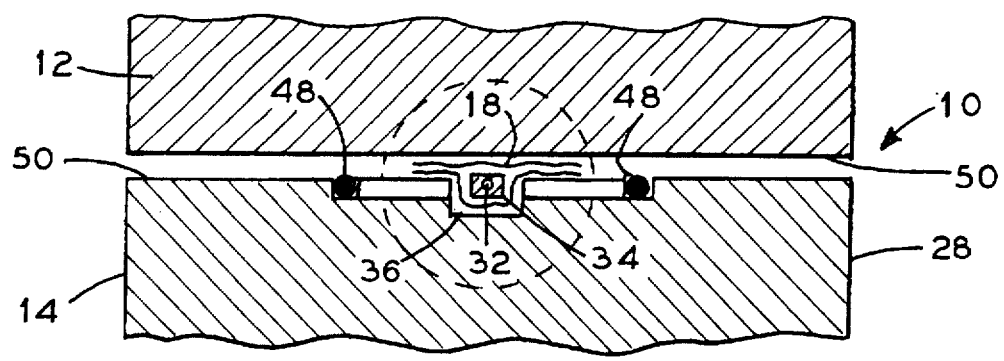
FIG. 3 is a pictorial sectional view of the neck region of the invention taken along lines 3—3 of FIG. 1.

Referring now to FIGS. 1–3, air inlet 32 in neck region 28 provides direct access to the interior of pressure bag 18 thereby allowing this bag 18 to become pressurized upon coupling inlet 32 to a pressure source (not shown). This air inlet 32 is surrounded by elastic seal strip 34 that fits within groove 36 in neck region 28. Elastic seal strip 34 extends slightly above groove 36 such that when upper and lower molds 12 and 14 are sealed together, seal strip 34 is compressed thereby sealing against groove 36 which will consequently prevent any resin 24 from leaking into bag 18 or out of neck region 28 along groove 36. Additional sealing is accomplished by transverse O-ring seal 48 which butts against seal strip 34.

Figure 5:
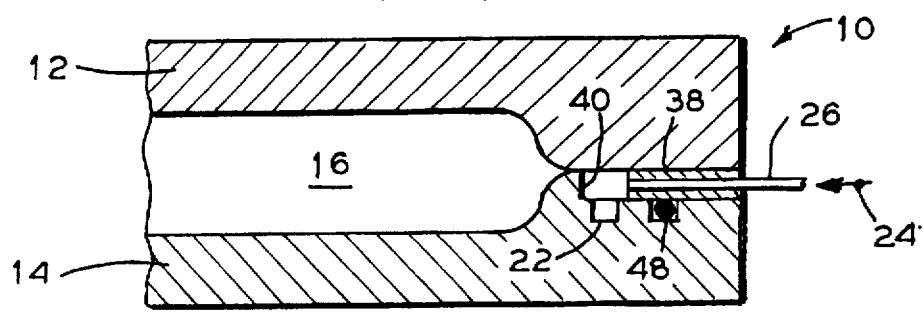
FIG. 5 is a pictorial sectional view of the resin injection region of the invention taken along lines 5—5 of FIG. 1.

FIG. 5 discloses a sectional view of injection port 26. This port 26 would also incorporate elastomer seal 38 that fits into groove 40. However, groove 40, as indicated, does not extend all the way to molding region 16, instead, groove 40 stops short of this region 16 and terminates instead at or just past resin groove 22 as shown. Also, elastomer seal 38 extends slightly above groove 40 such that as upper and lower molds 12 and 14 are sealed together, elastomer seal 38 is compressed thereby sealing against groove 40 which prevents any resin 24 from leaking out of molding system 10 via groove 40. Instead, all the injected resin 24 is forced into resin grooves 22.

Figure 6:
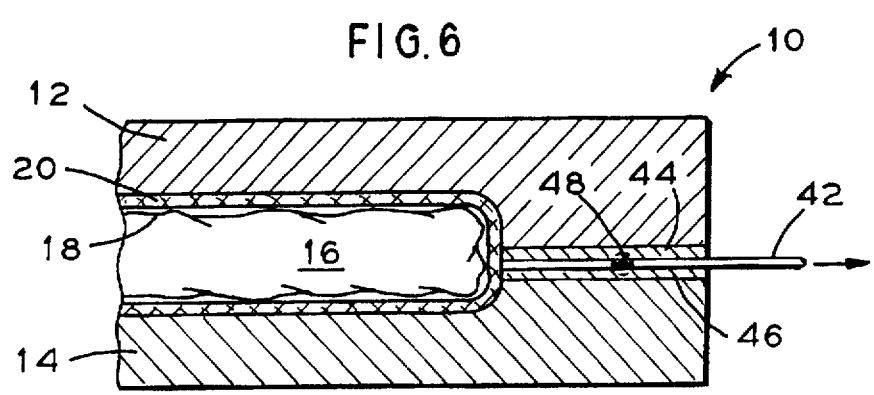
FIG. 6 is a pictorial sectional view of the vent region of the invention taken along lines 6—6 of FIG. 1.

Referring now to FIG. 6, there is shown vent 42 which would typically be located at the tip of the molded blade (or other object) as shown in FIG. 1. In other words, vent 42 is located some distance away from resin grooves 22 so that vent 42 will be the last area reached by the injected resin 24. Consequently, by the time resin 24 reaches vent 42 (this resin 24 saturating cloth strips 20 and displacing the air therein), the entire area of molding region 16 exterior of pressure bag 18 will have been filled by such resin 24. Thus, once vent 42 begins to bleed or vent 100% resin 24, no further resin 24 need be injected into molding system 10 since all of molding region 16 outside of pressure bag 18 will now be filled with such resin 24. When this occurs, all of cloth strips 20 will also have been saturated by resin 24.

However, before 100% resin 24 begins to escape via vent 42, this vent 42 would first provide a means for air to leave molding region 16 as such air becomes displaced by the injected resin 24. Again, vent 42 incorporates a pressure seal 44 placed within groove 46 which may be created in either or both upper and lower molds 12 and/or 14. This seal 44 will be compressed in the typical manner upon the sealing of these molds 12 and 14 together. Such compression will cause pressure seal 44 to seal against groove 46. Also, as shown in FIG. 6, vent 42 extends all the way to molding region 16 so that any air between pressure bag 18 and molds 12 and 14 can escape via such vent 42.

The drawings also disclose O-ring seal 48 that extends just inside the outer periphery of lower mold 12 in order to encircle or enclose both resin groove 22 and molding region 16. Again, if desired, O-ring 48 can be of any configuration and can be constructed to extend along upper mold 14 as well. O-ring 48 is sized to extend slightly above its respective groove in the typical manner so that when upper and lower molds 12 and 14 are closed, a seal will be formed. However, a slight or minute gap 50 will still exist between these upper and lower molds 12 and 14 in the vicinity of resin groove 22 with the gap 50 being in the order of a few thousandths of an inch or so thick. It is through this gap 50 that resin 24 is squeezed or travels as it passes from grooves 22 and 30 into molding region 16.

Since resin 24 will be forcibly injected into molding system 10, this same energy will be the driving force causing resin 24 to squeeze through gap 50 toward molding region 16 along the length of grooves 22 and 30. However, O-ring 48 will prevent any such resin 24 from leaking out of molding system 10 instead, O-ring 48 will contain this pressurized resin within is boundaries. As a result of this method of construction, after resin 24 has cured and molding system 10 is opened, a thin extension of cured resin 24 will need to be chipped or otherwise removed from around the perimeter of the now molded blade or object.

It should be noted that O-ring is not continuous along the perimeter of molding system 10. Instead, as shown in FIG. 3, at neck region 38 a small gap in O-ring 48 will exist which will be just wide enough for elastic seal strip 34 to fit therebetween. Thus, as this elastic seal strip 34 is compressed, it will not only seal against its respective groove 36, but also against O-ring 48 so as to prevent any escape of resin 24. Likewise, as shown in FIG. 6, a similar gap in O-ring 48 will exist at vent 42 which will be just large enough for pressure seal 44. Thus, upon the closing of molding system, pressure seal 44 will be forced to form a seal with O-ring 48. In this fashion, while O-ring 48 is, in reality, not continuous, it acts as if it were one continuous O-ring. As shown in FIG. 5, O-ring 48 passes underneath injection port 26 and its associated groove 40. In this fashions O-ring 48 and elastomer seal 38 will be in contact with each other to prevent the escape of any resin 24 from molding system 10.

Thus, for operation, molding system 10 would be opened so that pressure bag 18 and cloth strips 20 could be placed within molding area 16. The end of bag 18 would generally extend outside molding system 10 as shown so that air inlet 32 could be placed in position to pressurize bag 18. The closing of upper and lower molds 12 and 14 would effectively seal molding region 16 with O-ring 48 preventing any leakage or escape from within system 10. Resin 24 would then be forcibly injected into resin grooves 22 with any displaced air being vented via vent 42. This resin 24 will take the path of least resistance and subsequently will travel along and fill grooves 22 and crossover groove 30 until such time that it is forced to travel or squeeze through small gap 50 on its way to molding area 16. Once resin 24 begins to enter molding area 16, it will saturate cloth strips 20 therein and fill the area between pressure bag 18 and upper and lower molds 12 and 14. In doing so, any air within grooves 22 or 30 and any air within the region between bag 18 and molds 12 and 14 will be forced out through vent 42 until such time that no more air is vented and instead 100% resin now escapes via vent 42. At this time, further resin injection will be curtailed with the resin 24 within molding system 10 being allowed to cure. Afterwards, molding system 10 would be opened and the molded object or air foil would be removed.

While the above described molding system 10 is designed primarily for use in creating a great many different hollow airfoils or fan blade designs, the features of this system 10 can easily be modified so that other devices can likewise be created with this process and utilizing similar structure. For example, by deleting pressure bag 18, solid devices can easily be formed.

What is claimed is:

1. A method of molding an article comprising the steps of:
   (a) constructing and arranging a first mold and a separable matching second mold, said first and second molds defining a recessed molding region therebetween corresponding to the article when said molds are secured together;
   (b) installing a resin groove in at least one of said molds, said resin groove extending alongside but spaced from said molding region;
   (c) forming a gap intermediate said first and second molds when said molds are secured together, said gap extending between said resin groove and said molding region;

(d) coupling a resin injection assembly to said resin groove for forcibly injecting resin into said groove, said resin travelling along said groove and being subsequently forced out of said groove, through said gap, and into said molding region of said first and second molds;

(e) coupling a vent assembly to said molding region for venting said molding region, said vent assembly being spaced from said resin groove; and, (f) sealing or enclosing said molding region and said resin groove via a seal assembly.

2. The method of molding as set forth in claim 1 further comprising the step of constructing said first mold as an elongated mold and wherein said resin groove has opposite spaced apart portions extending along opposite longitudinal sides of said molding region.

3. The method of molding as set forth in claim 2 further comprising the step of locating said vent assembly adjacent a first longitudinal end of said first mold.

4. The method of molding as set forth in claim 3 further comprising the step of installing a resin crossover groove adjacent a second longitudinal end of said first mold, said resin crossover groove interconnecting opposite portions of said resin groove.

5. The method of molding as set forth in claim 4 further comprising the step of inserting an inflatable bag within said molding region, said inflatable bag being coupled to an air inlet for the pressurization of said bag within said molding region.

6. The method of molding as set forth in claim 5 further comprising the step of locating said air inlet at or adjacent said second longitudinal end of said first mold.

7. The method of molding as set forth in claim 6 further comprising the step of constructing said resin crossover groove in said second mold.

8. The method of molding as set forth in claim 7 further comprising the step of constructing and arranging said molding region in the shape of an air foil.

9. A molding system for molding an article, comprising:

(a) a first mold and a separable matching second mold, said first and second molds defining a recessed molding region therebetween corresponding to the article to be molded when said molds are secured together;

(b) a resin groove in at least one of said molds extending alongside but spaced from said molding region;

c) a gap intermediate said first and second molds when said molds are secured together, said gap forming a passageway between said resin groove and said molding region;

(d) resin injection means coupled to said resin groove for forcibly injecting resin into said groove, said resin travelling along said groove and being subsequently forced out of said groove, through said gap, and into said molding region of said first and second molds;

(d) vent means coupled to said molding region for venting said molding region, said vent means being spaced from said resin groove; and (f) seal means for sealing or enclosing said molding region and said resin groove.

10. The molding system as set forth in claim 9 wherein the molding system is elongated and wherein said resin groove extends along one longitudinal side of said molding region, said molding system including a further resin groove spaced from said first mentioned resin groove and extending along an opposite longitudinal side of said molding region.

11. The molding system as set forth in claim 10 wherein said vent means is located at a first longitudinal end of the molding system.

12. The molding system as set forth in claim 11 further comprising a resin crossover groove adjacent a second longitudinal end of the molding system, said resin crossover groove interconnecting said first mentioned and said further resin grooves.

13. The molding system as set forth in claim 12 further comprising an inflatable bag inserted within said molding region, said inflatable bag being coupled to an air inlet for the pressurization of said bag within said molding region.

14. The molding system as set forth in claim 13 wherein said air inlet is located at said second longitudinal end of the molding system.

15. The molding system as set forth in claim 14 wherein said resin crossover groove is in said second mold.

16. The molding system as set forth in claim 15 wherein said molding region is in the shape of an air foil.

* * * * *